UNITED STATES PATENT OFFICE.

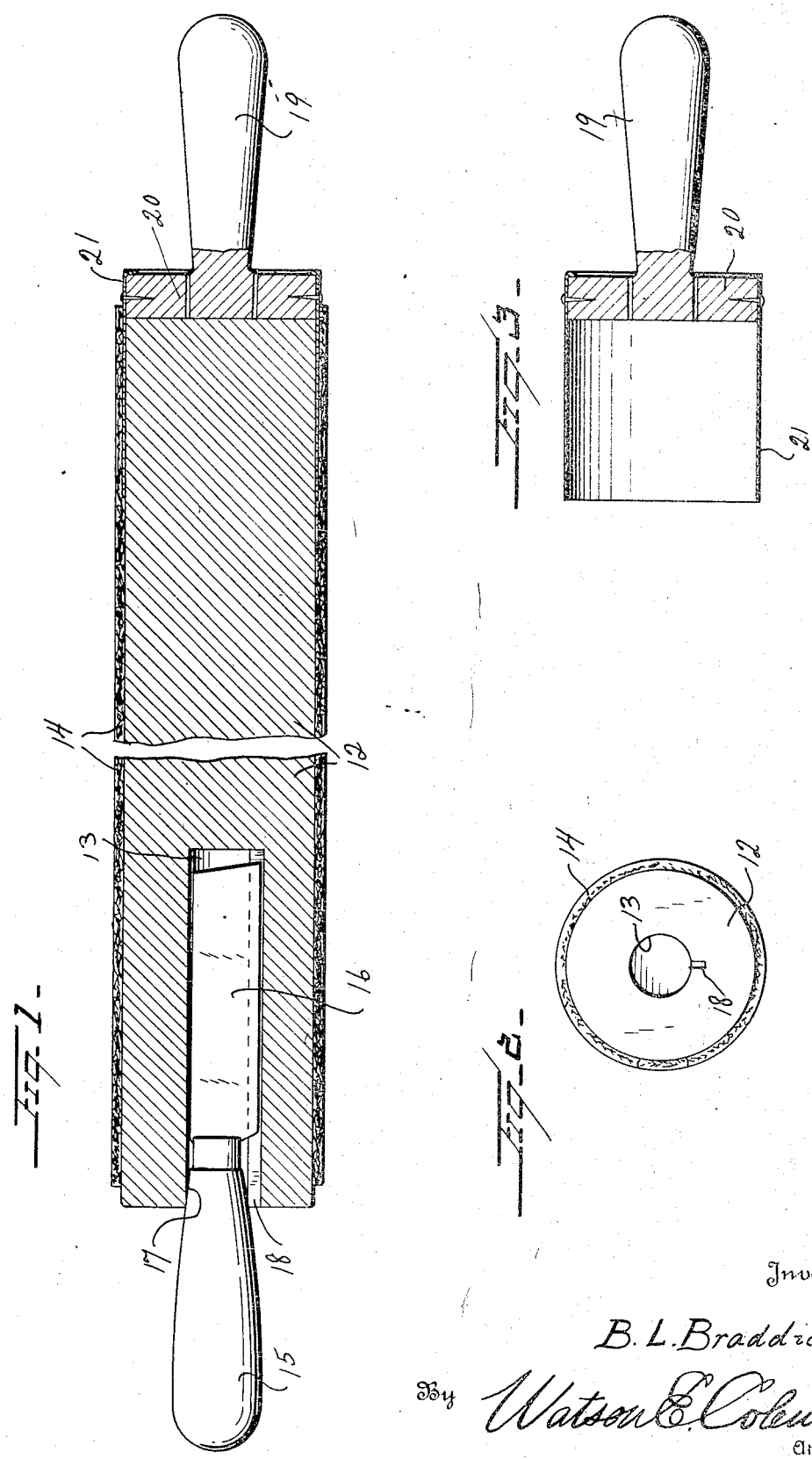

BERNARD L. BRADDICK, OF SAN DIEGO, CALIFORNIA.

DOUGH-ROLL AND ROLLING-PIN.

1,398,621.   Specification of Letters Patent.   Patented Nov. 29, 1921.

Application filed February 4, 1920. Serial No. 356,165. Renewed October 12, 1921. Serial No. 507,355.

*To all whom it may concern:*

Be it known that I, BERNARD L. BRADDICK, a citizen of the United States, residing at San Diego, in the county of San Diego and State of California, have invented certain new and useful Improvements in Dough-Rolls and Rolling-Pins, of which the following is a specification, reference being had to the accompanying drawings.

This invention relates to the art of rolling dough for the making of biscuits, bread, pastry, etc., and particularly to an improved bread roll as it may be termed and an improved rolling pin coacting therewith.

In rolling out dough in order to make biscuits, pastry and pie crust, the flour is mixed with shortening and this shortening is rubbed into the flour before any liquid is added. Now if too much liquid is added the material cannot be properly worked on the rolling board and with the rolling pin, and more flour must be added. The more of dry flour which is added after the dough is mixed, the heavier and soggier will be the biscuits when they come out of the oven. The wetter the dough is the more liable it is to stick to the rolling pin and the board.

One of the objects of the invention is to provide a rolling pin whose periphery is covered with a textile material forming the surface of the rolling pin, and preventing wet dough from sticking to the rolling pin.

A further object is to provide a rolling pin of such construction that the layer of textile fabric surrounding the rolling pin may be readily removed therefrom, and one of the handles of the pin removed so that the rolling pin may be used as a potato masher or for any like purpose.

Another object is to connect one of the handles of the rolling pin to the body of the pin by means of a sleeve which forms a cake or biscuit cutter and may be used as such.

A further object is to provide the other handle of the pin in the form of a knife insertible into a suitable socket of the rolling pin, but detachable therefrom, which knife may be used for trimming the dough.

Other objects will appear in the course of the following description.

My invention is illustrated in the accompanying drawings, wherein:

Figure 1 is a longitudinal section of the rolling pin;

Fig. 2 is an end view of one end of the rolling pin;

Fig. 3 is a sectional view of the opposite handle of the rolling pin.

The rolling pin consists of a cylindrical body 12 having a longitudinally extending socket 13 in one end. The body is preferably of wood, though any other suitable material may be used and is covered by a sheath 14 of canvas, duck or other suitable material. The sheath 14 is adapted to fit snugly upon the body, but may be removed therefrom.

One of the handles of the rolling pin is formed by a knife handle 15 having a blade 16 which fits in the socket 13. The handle is beveled adjacent its inner end as at 17 to fit snugly in the socket and the socket 13 is longitudinally grooved as at 18, the blade of the knife fitting in this groove. Normally, of course, the handle is kept within this socket, thus the knife is kept clean and out of contact with dirt.

The opposite handle 19 is attached to and formed in one piece with a relatively large disk 20 having vents and attached to this disk is a cylindrical sleeve 21 which normally fits between the body 12 and the sheath 14, this sleeve being attached to the disk 21 in any suitable manner, as by small screws or nails. The sleeve 21 constitutes a biscuit or cake cutter, but the sleeve 21 fits snugly enough upon the body 12 that the handle 19 forms a proper handle for the rolling pin.

Now I have found in actual practice that dough, even wet or damp dough, will not stick to canvas as it will to a bread board and to a wooden roller, and as a consequence of this, after the dough has been rolled, the canvas may be readily cleaned of any particles of dough by shaking the canvas and brushing it off.

This device is particularly intended for outdoor use, as in camps, on outing parties, automobile tours, as part of an aeroplane equipment, etc., but it is obvious that it may be also used indoors. In practice, the dough rolling equipment as described, has been found thoroughly effective, sanitary and particularly good when rolling biscuit dough or pastry crust, and the dough does not require to be sprinkled with flour, this rendering the biscuit or pastry soggy and heavy as in the case where the flour is not properly mixed with the shortening.

It will likewise be seen that the knife 16 and the biscuit cutter 21 are fully protected from dirt and yet may be readily used whenever required.

Another advantage of the use of canvas as a covering for the rolling pin lies in the fact that the canvas does not have to be washed, except at long intervals as the dough does not stick to the canvas and any flour or particles of dough may be readily brushed off.

What I claim is:

1. A rolling pin body, a removable sheath of textile material, a handle at one end of the rolling pin and a handle at the opposite end, said handle being attached to a disk having a diameter as large as the diameter of the rolling pin, and a sleeve attached to the disk forming a cake cutter, said sheath coöperating with the body to provide a pocket, said sleeve engaging the body within the pocket.

2. A rolling pin having a handle at one end and a longitudinally extending socket at its other end, the wall of said socket having a longitudinal groove, and a rolling pin handle having a blade in one end portion, said end portion being insertible into said socket, said blade being insertible into the groove, the blade coöperating with the groove to prevent rotation of the handle within the socket.

In testimony whereof I hereunto affix my signature.

BERNARD L. BRADDICK.